(12) United States Patent
Kemp et al.

(10) Patent No.: US 7,270,796 B2
(45) Date of Patent: Sep. 18, 2007

(54) AMMONIUM/AMMONIA REMOVAL FROM A STREAM

(75) Inventors: Philip Mason Kemp, Pomfret, CT (US); Mark Matthew Simon, Wilbraham, MA (US); Stephen Howard Brown, Spencer, MA (US)

(73) Assignee: CASTion Corporation, Worcester, MA (US)

( * ) Notice: Subject to any disclaimer, the term of this patent is extended or adjusted under 35 U.S.C. 154(b) by 121 days.

(21) Appl. No.: 11/203,035

(22) Filed: Aug. 11, 2005

(65) Prior Publication Data

US 2007/0039893 A1 Feb. 22, 2007

(51) Int. Cl.
C01C 1/10 (2006.01)
C01C 1/242 (2006.01)

(52) U.S. Cl. ...................... 423/549; 210/649; 210/681; 210/687; 210/688; 210/702; 423/356; 423/357

(58) Field of Classification Search ................ 423/352, 423/356, 357, 649, 702, 681, 687, 688, 549; 210/903
See application file for complete search history.

(56) References Cited

U.S. PATENT DOCUMENTS

| | | | | |
|---|---|---|---|---|
| 4,211,646 A | * | 7/1980 | Westbrook et al. | 210/631 |
| 4,522,727 A | * | 6/1985 | Weber | 210/673 |
| 5,304,365 A | * | 4/1994 | Taborsky | 423/352 |
| 5,462,666 A | * | 10/1995 | Kimmel | 210/602 |
| 5,512,182 A | * | 4/1996 | Sheikh et al. | 210/668 |
| 5,670,046 A | * | 9/1997 | Kimmel | 210/602 |
| 6,077,494 A | * | 6/2000 | Gasiorowski et al. | 423/357 |
| 6,391,207 B1 | | 5/2002 | Cluyse | 210/700 |
| 6,838,069 B2 | * | 1/2005 | Blonigen et al. | 423/352 |
| 6,881,339 B1 | * | 4/2005 | Hogl et al. | 210/605 |
| 7,033,562 B2 | * | 4/2006 | Knasiak | 423/352 |
| 2002/0159942 A1 | * | 10/2002 | Jessup et al. | 423/352 |
| 2003/0196965 A1 | * | 10/2003 | Haggerty | 210/718 |
| 2004/0025715 A1 | | 2/2004 | Bonde et al. | 99/485 |

FOREIGN PATENT DOCUMENTS

DE 35257701 * 1/1987 ................. 423/352

OTHER PUBLICATIONS

R. Sheikholeslami, "Assessment of the Scaling Potential for Sparingly Soluble Salts in RO and NF Units", Desalination 167 (Mar. 2004) pp. 247-256.
B. Norddahl et al., "The Biorek Concept for the Conversion of Organic Effluent to Energy, Concentrated Fertiliser and Potable Water", BIOSCAN A/S, May 2000, 4 pages.
S. Williams, "Struvite Precipitation in the Sludge Stream at Slough Wastewater Treatment Plant and Opportunities for Phosphorus Recovery", Environmental Technology, Jul. 1, 1999, vol. 20, No. 7, pp. 743-747; Abstract Only, 2 pages.
Linda Gaulke et al., "Reducing Methanol Requirements for the LOTT Biological Nutrient Removal Wastewater Treatment Plant", LOTT Wastewater Treatment Plant, Olympia, WA; Jun. 2004, 99 pages.

* cited by examiner

Primary Examiner—Wayne A. Langel
(74) Attorney, Agent, or Firm—Cantor Colburn LLP

(57) ABSTRACT

In one embodiment, an ammonium removal method can comprise: removing a multivalent cation from a stream comprising ammonium to form a treated stream; converting the ammonium in the stream to ammonia by increasing the pH of the stream; and separating the ammonia from the treated stream to form a separated stream and gaseous ammonia. In another embodiment, an ammonium removal method can comprise: a multivalent cation from a stream comprising ammonium to form a treated stream comprising a total of less than or equal to about 50 ppm by weight of multivalent cations; increasing the pH of the stream to a conversion pH; converting the ammonium to ammonia; and separating the ammonia from the treated stream to form a separated stream and gaseous ammonia.

28 Claims, No Drawings

AMMONIUM/AMMONIA REMOVAL FROM A STREAM

BACKGROUND

This disclosure generally relates to an ammonium/ammonia removal/recovery process, and especially relates to ammonium/ammonia removal/recovery with suppression of struvite formation and/or suppression of sparingly soluble salts precipitation.

Wastewater and/or process water often contain large amounts of ammonium ($NH_4$), which can not be released into the environment. Increasing the pH to form gaseous ammonia ($NH_3$) can result in struvite precipitation and/or the precipitation of other sparingly soluble salts. Struvite is, essentially, soluble magnesium combined with ammonia and phosphate to form magnesium ammonium phosphate ($MgNH_4PO_4 \cdot 6H_2O$); a common form of struvite. Struvite is a hard, tenacious solid that scales, adhering to pipe and valve surfaces forming tuberculates. Struvite is extremely difficult to remove from equipment surfaces such as fittings, pipes, and valves. It is generally encountered in sludge lines and downstream processes following biological treatment. Deposits tend to form in pipes where wastewaters stagnate between intermittent flows, but also in areas where there is turbulent flow, pressure change or where cavitations can occur. Struvite deposition occurs most frequently in pipes, pipe elbows, valves, centrifuge weir overflows, pumps, etc.

Struvite deposition is becoming an increasingly widespread problem for a great many wastewater treatment plants. In extreme cases the struvite can reduce the throughput so significantly that the plant operation has to be stopped for the blocked pipe work and other equipment to be cleaned.

Various proposals have been made in order to deal with this problem, many with some degree of success, but none of them have successfully overcome this problem completely. For example, there have been suggestions to prevent struvite formation by removing ammonia and phosphate chemically by the addition of magnesium to raise the pH. Another proposal has been to add ferric salts and anionic polymer. However, the addition of such large amounts of ferric salt could have a detrimental effect on the plant equipment.

In addition to struvite formation at elevated pH, sparingly soluble salts can precipitate with a change of pH. A number of sparingly soluble salts will precipitate and cause clogging and failure of process equipment. Sparingly soluble salts of $CaSO_4$, $BaSO_4$, $SrSO_4$, and $Mg(OH)_2$ are some examples of salts that have a low solubility and can precipitate.

Due to the effects of the release of large amounts of nitrogen in a cleaned wastewater stream, stringent effluent requirements dictate low ammonia/ammonium release, often a total nitrogen release of less than 100 milligrams per liter (mg/L), with as low as less than 3 mg/L sometimes required by regulatory authorities. Hence, there continues to be a need for ammonium/ammonia removal processes that avoid struvite formation and/or precipitation of sparingly soluble salts.

BRIEF SUMMARY

Disclosed herein are methods and systems for the removal of ammonium from a stream.

In one embodiment, an ammonium removal method can comprise: removing a multivalent cation from a stream comprising ammonium to form a treated stream; converting the ammonium in the stream to ammonia by increasing the pH of the stream; and separating the ammonia from the treated stream to form a separated stream and gaseous ammonia.

In another embodiment, an ammonium removal method can comprise: removing a multivalent cation from a stream comprising ammonium to form a treated stream comprising a total of less than or equal to about 50 ppm by weight of multivalent cations; increasing the pH of the stream to a conversion pH; converting the ammonium to ammonia; and separating the ammonia from the treated stream to form a separated stream and gaseous ammonia.

In yet another embodiment, an ammonium removal method can comprise: removing solids from a stream comprising ammonium; contacting the stream with an ion exchange metal scavenger to remove a multivalent cation from the stream to form a treated stream; increasing a pH of the treated stream greater than or equal to about 9.0; converting the ammonium to ammonia; stripping the ammonia from the treated stream to form a separated stream and an ammonia stream; and reducing a pH of the ammonia stream.

In one embodiment, an ammonium removal system can comprise: a solids removal tank; a multivalent cation remover disposed downstream of the solids removal tank and capable of removing a multivalent cation from a stream to form a treated stream; a base source capable of sufficiently increasing a pH of the treated stream to convert greater than or equal to about 50 wt % of ammonium in the stream to ammonia; an ammonia removal tank capable of separating the ammonia from the treated stream; and an ammonia recovery device.

The above described and other features are exemplified by the following detailed description.

DETAILED DESCRIPTION

Disclosed herein is a process for removing nitrogen (e.g., ammonium and/or ammonia) from a stream while inhibiting struvite formation or precipitation of sparingly soluble salts. The method comprises removing multivalent cations from the liquid stream prior to increasing the pH of the stream in order to form gaseous ammonia ($NH_3$) which is removed from the stream, and then optionally converted back to ammonium ($NH_4$), while the stream can optionally be further processed.

The stream, for example, can be a wastewater stream (e.g., municipal and/or industrial), process stream, or the like, that may be treated and released to the environment, and/or used, e.g., in a boiler, cooling tower, and the like. Depending upon the stream and its contents, initial suspended solids removal may be desirable. This initial solids reduction can be achieved optionally via dissolved air flotation (DAF), and/or another process. Not to be bound by theory, DAF is a process for the removal of suspended material from an aqueous suspension, wherein the term "flotation" indicates something floated on or at the surface of a liquid. DAF uses air bubbles that become attached to suspended material to be removed. Attraction between the air bubbles and particles, resulting from standard free energy differences that are a function of the characteristics of the particle surface and the micro bubble, or physical entrapment (enmeshing) in the particle matrix, reduces the specific gravity of the particle resulting in increased buoyancy, thus enhancing flotation. Chemical conditioning can be used to increase the effectiveness of the dissolved air flotation process.

Following the initial solids removal, the stream can optionally be filtered. The amount and type of filters employed depends upon the types and concentration of solid(s) remaining in the stream as well as the desired final total suspended solids (TSS) concentration of the stream. For example, the stream can be treated with backwashing filter(s) (e.g., continuously backwashing filter(s)), multimedia filter(s), cartridge filter(s), and the like, as well as combinations comprising at least one of the foregoing filters. The filtering process can be employed to remove the total suspended solids (TSS) down to at desired level, e.g., to less than or equal to about 50 parts per million (ppm) by weight, or, more specifically, less than or equal to about 25 ppm, or, even more specifically, less than or equal to about 3 ppm.

Depending upon the composition of the stream, once filtered, the stream can be treated to inhibit bacteriological growth. For example, the stream can be chemically treated (e.g., chlorination, ozonation, peroxidation and the like) and/or can be treated with ultraviolet radiation (UV) to destroy bacteria and reduce bacteriological growth and contamination of down stream processes.

Before and/or after the above processes, the stream is treated to remove multivalent cation(s) (e.g., ions of magnesium (Mg), calcium (Ca), barium (Ba), strontium (Sr), manganese (Mn), iron (Fe), transition metals, and the like, as well as combinations comprising at least one of the foregoing). Various removal processes capable of removing a sufficient amount of these multivalent cations to inhibit and preferably prevent struvite formation and/or precipitation of the sparingly soluble salts during ammonium removal, can be employed. For example, the stream can contact an ion exchange metal scavenger, such as a chelating resin, strong acid, weak acid resin, a softening resin, and the like, as well as combinations that comprise at least one of the foregoing, that scavenges one or more of the multivalent cations. Possible ion exchange scavengers include, for example, iminodiacetate functional chelating resin, and the like. Other possible multivalent cation removers include lime softener (e.g., cold lime softener, hot lime softener, and the like); precipitation clarifier; microfilter; water softener; acid cation exchange (e.g., weak acid cation exchange, strong acid cation exchange, and the like); air flotation (e.g., dissolved air flotation (DAF); induced air floatation (IAF), and the like); hot lime softener; and the like, as well as combinations comprising at least one of the foregoing.

Depending upon the scavenger or metal removal device employed, once saturated, it can be replaced, regenerated, or the precipitated materials can be removed. Regeneration of the scavenger or softener for example can be accomplished, with sodium chloride (NaCl), mineral acid, or the like. If a mineral acid is used, however, it may be desirable to back condition the scavenger with a base (e.g., sodium hydroxide (NaOH)) for pH control. Additionally, if the stream comprises iron, de-fouling may be desirable since the iron can foul the softening ion exchange resin. De-fouling can comprise a treatment, such as treatment with hydrogen chloride (HCl) and/or sulfide chemistries.

It is desirable to remove the multivalent cations down to a level, per multivalent cation, of less than or equal to about 3 ppm by weight, or, more specifically, less than or equal to about 1 ppm by weight, or, even more specifically, less than or equal to about 0.5 ppm by weight. It is more desirable to remove the total multivalent cations in the stream down to a total level (e.g., of all of the multivalent cations in the stream) of less than or equal to about 3 ppm by weight, or, more specifically, less than or equal to about 1 ppm by weight, or, even more specifically, less than or equal to about 0.5 ppm by weight. The specific amount of removal desired is dependent upon the particular multivalent cation as well as the pH that will be employed in the subsequent processing of the stream. Desirably, the multivalent cations are removed to a level that will not precipitate at the pHs employed in the processing of the stream (i.e., precipitate in an amount of less than or equal to 1 ppm).

Once the multivalent cations (or, particularly, the Ca, Mg, Sr, Ba, Fe, Mn, and any remaining transition metals, or, even more particularly, the Ca and Mg), have been removed from the stream, the stream can be processed for the $NH_4$ conversion. $NH_4$ conversion can comprise increasing the pH of the stream, e.g., sufficiently increasing the pH of the stream to convert greater than or equal to about 50 weight percent (wt %) of the ammonium in the stream to ammonia, or, more specifically, to convert greater than or equal to about 70 wt % of the ammonium to ammonia. For example, the stream is introduced to a tank (e.g., a sealed/air-tight reaction tank) and contacted with a weak or strong base (e.g., sodium hydroxide (NaOH), potassium hydroxide (KOH), and the like, as well as combinations comprising at least one of the foregoing). Alternatively, or in addition, the base is introduced directly to an ammonia removal unit (e.g., a flash stripping tower, such as a vacuum assisted flash stripping tower).

The desired pH level is based upon the desired ammonium reduction (e.g., the percentage of $NH_4$ conversion desired), the temperature of the fluid, and the system pressure. Although, at room temperature and pressure (e.g., about 25° C. and about 1 atmosphere (atm)), a pH of greater than or equal to about 9.9 can be employed for a conversion of $NH_4$ to $NH_3$ of about 80 wt %, a pH of about 10.5 to about 11 can be employed for additional $NH_4$ conversion. A lower pH could be used at a higher temperature and/or lower pressure, e.g., greater than or equal to a pH of about 9. For an $NH_4$ conversion of greater than or equal to about 98 wt %, a pH of greater than or equal to about pH 12 can be employed, wherein the above weight percentages are based upon a total weight of $NH_4$ in the stream. At these pHs, the $NH_4$ converts to ammonia ($NH_3$) (e.g., non-ionized gaseous ammonia).

Once the $NH_4$ has been converted to $NH_3$, the $NH_3$ can be removed from the stream using various techniques, such as gas stripping tower, a vacuum assisted flash striping tower (e.g., CASTion R-CAST, commercially available from CASTion, Worcester, Mass.). This vacuum assisted flash stripper features a patented baffle technology. The baffle technology and other aspects of the Reverse-CAST technology are described in U.S. Pat. Nos. 4,770,748 and 4,880,504. The baffle technology in conjunction with the temperature and vacuum controls minimizes the carry over of water vapor with the ammonia gas. This technique minimizes dilution of the ammonium product and increases purity when the gas contacts the acidic solution used to capture the $NH_3$ liberated by the gas stripper.

For example, the $NH_3$ stream can be directed to a vacuum assisted flash stripping tower where the $NH_3$ is removed (e.g., flashed/stripped) from the pH adjusted stream, that is virtually free of multivalent cations. The tower, for example, can use a pump to circulate the stream through a spray nozzle. The spray nozzle breaks the water into small droplets such that the $NH_3$ gas is removed from the droplets (e.g., under vacuum). Shifting temperature, pH, and/or pressure causes the ammonia gas to leave the stream. The vacuum assisted flash striping tower features controls that allow the operator to control the temperature, pH and the vacuum on the system. It is noted that higher temperatures increase the volatility of the NH$_3$ gas and improve its removal efficiency. Some applications adjust the temperature of the feed liquor. However, this is less desirable than adjusting the pressure and/or pH due to its high energy cost. Increasing the pH or the vacuum applied to the feed liquor shifts the chemical equilibrium toward ammonia gas formation (NH$_4$ to NH$_3$) and improves the overall removal efficiency of the NH$_3$ by the process.

The NH$_3$ gas can be, for example, withdrawn from the vacuum assisted flash striping tower with the use of a venturi that creates a vacuum on the stripping tower. The venturi associated with the tower can provide nearly full vacuum on the tower thus allowing for rapid and nearly complete separation of the NH$_3$ gas from the liquid. During operation, for example, the suction side of the venturi draws the ammonia gas into the venturi where it is converted back to NH$_4$ when it comes into contact with the circulated water containing an acid such as sulfuric, nitric, hydrochloric, phosphoric, and/or another acid. In the case of sulfuric acid, the reaction creates (NH$_4$)$_2$SO$_4$ (ammonium sulfate); a salable product that can be used in the fertilizer industry or other areas as raw material. The purity of the ammonium sulfate is high due to the minimal passage of volatile organic compounds (VOC's) which are, for example, primarily removed in the biological process upstream from the municipal centrifuges in the case of municipal centrate.

The gaseous NH$_3$, for example, can be collected and stored, and/or can be converted back to NH$_4$. The NH$_3$ can be converted by introducing the gas into a circulated acidic stream, such as sulfuric acid. The acidic stream (water stream containing an acid) can be pumped from a tank (e.g., a simple atmospheric tank) and directed to the venturi were the gases are withdrawn from the reaction vessel under vacuum into the suction side of the venturi and directly mixed with the acid stream. For example, the acidic stream is circulated in a closed loop fashion so that it builds in NH$_4$ concentration with negligible dilution. When the acidic stream becomes saturated with the NH$_4$ (or when a sufficient amount of ammonium compound has been produced), the solution (e.g., ammonium sulfate solution) is removed (e.g., discharged) on a batch basis, and the process is continued with fresh acid and water. Conversion of the NH$_3$ back to NH$_4$ is achieved as the gas flows into the acid stream; thereby reducing the pH. The pH reduction can be done, for example, to a pH of less than or equal to about 5, or, more specifically, at a pH of about 3.5 to about 4.5.

At the reduced pH, the NH$_3$ reacts with the acid (e.g., sulfuric acid) to form an ammonium compound (e.g., ammonium sulfate (NH$_4$)$_2$SO$_4$). The pH of the recirculated acid stream will naturally increase as it loads up with the ammonia gas, thereby reducing the amount of base for neutralization of the ammonium sulfate (NH$_4$)$_2$SO$_4$. The ammonium sulfate, which has a high purity, can be employed in various applications, e.g., can be sold as fertilizer or raw material for other uses.

The remaining liquid stream (the reduced ammonia stream) can optionally be further processed. For example, the pH of the stream can be adjusted to meet discharge parameters (to enable release of the stream to the environment), and/or to enable further use of the stream (e.g., cooling towers, boiler feed, and the like), as well as combinations comprising at least one of the foregoing.

The present process enables the removal of ammonium from a stream (aqueous, semi-aqueous, or non-aqueous stream) at an elevated pH without the problems of struvite formation and/or precipitation of other sparingly soluble salts. Adjusting the temperature and/or pressure can reduce base consumption. High NH$_4$ conversion and subsequent removal levels (e.g., greater than or equal to about 90 wt %) can be attained at high pH values (e.g., greater than or equal to about 9) due to the previous removal of the Mg and other multivalent cations from the stream which otherwise would have resulted in precipitation and inhibited equipment performance due to fouling. At these high pH levels, precipitates such as struvite and calcium carbonate can form if Mg and Ca, respectively, are present.

The present system can employ a simple water softener to remove the multivalent cations (e.g., a softener that uses only sodium chloride (NaCl) for regeneration), thereby providing an economical way to inhibit struvite formation and precipitation of sparingly soluble salts.

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The modifier "about" used in connection with a quantity is inclusive of the stated value and has the meaning dictated by the context (e.g., includes the degree of error associated with measurement of the particular quantity). The notation "±10%" means that the indicated measurement may be from an amount that is minus 10% to an amount that is plus 10% of the stated value.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ammonium removal method, comprising:
   removing a multivalent cation from a stream comprising ammonium to form a treated stream;
   converting the ammonium in the treated stream to ammonia by increasing the pH of the stream; and
   separating the ammonia from the treated stream to form a separated stream and an ammonia stream.

2. The method of claim 1, further comprising reducing a pH of the ammonia stream to a pH of less than or equal to about 5.

3. The method of claim 1, further comprising removing solids from the aqueous stream prior to the removal of the multivalent cations.

4. The method of claim 1, wherein the multivalent cation comprises an ion of a metal selected from the group consisting of Ca, Ba, Sr, Fe, Mg, Mn, a transition metal, and combinations comprising at least one of the foregoing metals.

5. The method of claim 4, wherein the metal comprises Ca.

6. The method of claim 4, wherein the metal comprises Mg.

7. The method of claim 1, wherein removing a multivalent cation further comprises contacting the stream with an ion exchange metal scavenger.

8. The method of claim 1, wherein greater than or equal to about 50 wt % of the ammonium in the stream is converted to the ammonia.

9. The method of claim 8, wherein greater than or equal to about 80 wt % of the amonium in the stream is converted to the ammonia.

10. The method of claim 9, wherein greater than or equal to about 90 wt % of the ammonium in the stream is converted to the ammonia.

11. the method of claim 1, wherein each of the multivalent cations in the stream are removed to a level of less than or equal to about 50 ppm by weight.

12. The method of claim 11, wherein each of the multivalent cations in the stream are removed to a level of less than or equal to about 25 ppm by weight.

13. The method of claim 12, wherein each of the multivalent cations in the stream are removed to a level of less than or equal to about 3 ppm by weight.

14. The method of claim 1, wherein the conversion occurs without the formation of struvite.

15. The method of claim 1, wherein ions of Mg in the stream are removed to a level of less than or equal to about 1 ppm by weight.

16. The method of claim 1, wherein the multivalent cations are removed to a level of less than or equal to about 3 ppm by weight, and further comprising adjusting a pH of the treated stream to meet discharge parameters.

17. The method of claim 1, further comprising reacting the gaseous ammonia with sulfuric acid to form ammonium sulfate.

18. An ammonium removal method, comprising:
   removing a multivalent cation from a stream comprising ammonium to form a treated stream;
   converting the ammonium in the treated stream to amonia by increasing the pH of the stream; and
   stripping the ammonia from the treated stream in a vacuum assisted flash stripping tower to form a separated stream and an ammonia stream.

19. The method of claim 18, further comprising creating a vacuum with a venturi.

20. An ammonium removal method, comprising:
   removing a multivalent cation from a stream comprising ammonium to form a treated stream comprising a total of less than or equal to about 3 ppm by weight of multivalent cations;
   increasing the pH of the stream to a pH at which ammonium converts to ammonia;
   converting the ammonium to ammonia; and
   separating the ammonia from the treated stream to form a separated stream and gaseous ammonia.

21. The method of claim 20, wherein the pH is increased without the precipitation of a sparingly soluble salt.

22. An ammonium removal method, comprising:
   removing solids from a stream comprising ammonium;
   contacting the stream with an ion exchange metal scavenger to remove a multivalent cation from the stream to form a treated stream;
   increasing a pH of the treated stream to greater than or equal to about 9;
   converting the ammonium to ammonia;
   stripping the ammonia from the treated stream to form a separated stream and an ammonia stream; and
   reducing the pH of the ammonia stream.

23. The method of claim 22, wherein the ion exchange metal scavenger comprises an iminodiacetate functional chelating resin.

24. An ammonium removal system, comprising:
   removing a multivalent cation from a stream comprising ammonium to form a treated stream, wherein the multivalent cation comprises an ion of Mg;
   increasing a pH of the treated stream to greater than or equal to about 9, wherein the ammonium in the stream converts to ammonia; and
   separating the ammonia from the treated stream to form a separated stream and an ammonia stream.

25. The method of claim 24, wherein the multivalent cation is removed to a level of less than or equal to about 50 ppm by weight.

26. The method of claim 25, wherein the multivalent cation is removed to a level of less than or equal to about 1 ppm by weight.

27. The method of claim 24, wherein greater than or equal to about 80 wt % of the ammonium in the stream is converted to the ammonia.

28. An ammonium removal system, comprising:
   removing multivalent cations from a stream comprising ammonium to form a treated stream, wherein each multivalent cation in the stream is removed to a level of less than or equal to about 25 ppm by weight, and wherein the multivalent cations comprises an ion of Mg;
   increasing a pH of the treated stream to greater than or equal to about 9, wherein the ammonium in the stream converts to ammonia;
   separating the ammonia from the treated stream to form a separated stream and an ammonia stream; and
   reducing a pH of the ammonia stream to less than or equal to about 5.

* * * * *